US005802645A

United States Patent [19]

Vrzalik

[11] Patent Number: 5,802,645

[45] **Date of Patent: *Sep. 8, 1998**

[54] LOW AIR LOSS BAG FOR PATIENT SUPPORT

[75] Inventor: John H. Vrzalik, San Antonio, Tex.

[73] Assignee: Kinetic Concepts, Inc., San Antonio, Tex.

[ * ] Notice: The term of this patent shall not extend beyond the expiration date of Pat. No. 5,152,021.

[21] Appl. No.: 950,656

[22] Filed: Oct. 15, 1997

Related U.S. Application Data

[63] Continuation of Ser. No. 822,366, Mar. 20, 1997, abandoned, which is a continuation of Ser. No. 618,337, Mar. 19, 1996, abandoned, which is a continuation of Ser. No. 299,326, Aug. 31, 1994, abandoned, which is a continuation of Ser. No. 948,460, Sep. 21, 1992, abandoned, which is a continuation of Ser. No. 494,787, Mar. 12, 1990, abandoned, which is a continuation of Ser. No. 273,759, Nov. 17, 1988, abandoned, which is a continuation of Ser. No. 57,516, Jun. 1, 1987, abandoned, which is a continuation-in-part of Ser. No. 905,553, Sep. 9, 1986, abandoned, which is a continuation-in-part of Ser. No. 784,875, Oct. 4, 1985, abandoned, which is a continuation-in-part of Ser. No. 683,153, Dec. 17, 1984, abandoned.

[51] Int. Cl.[6] .................................................... A61C 7/04

[52] U.S. Cl. ........................................ 5/710; 5/715; 5/731

[58] Field of Search ............................... 5/600, 706, 710, 5/711, 712, 713, 714, 715, 731, 914, 901.5

[56] References Cited

U.S. PATENT DOCUMENTS

| | | | |
|---|---|---|---|
| 1,722,310 | 8/1929 | Hart . | |
| 2,534,471 | 12/1950 | Norheim . | |
| 2,690,177 | 9/1954 | Hogan . | |
| 3,302,218 | 2/1967 | Stryker . | |
| 3,303,518 | 2/1967 | Ingram . | |
| 3,390,674 | 7/1968 | Jones . | |
| 3,426,373 | 2/1969 | Scott et al. | 5/456 |
| 3,434,165 | 3/1969 | Keane . | |

(List continued on next page.)

FOREIGN PATENT DOCUMENTS

| | | | |
|---|---|---|---|
| 210469 | 4/1956 | Australia . | |
| 0168213 | 1/1986 | European Pat. Off. . | |
| 168213 | 1/1986 | European Pat. Off. . | |
| 0228233 | 7/1987 | European Pat. Off. . | |
| 2816642 | 4/1978 | Germany . | |
| 3217981 | 11/1982 | Germany . | |
| 52-26074 | 7/1977 | Japan | A61G 7/04 |
| 53-98793 | 8/1978 | Japan | A61G 7/02 |
| 946831 | 1/1964 | United Kingdom . | |
| 959103 | 5/1964 | United Kingdom . | |

(List continued on next page.)

OTHER PUBLICATIONS

Brochure "The Egerton Turning and Tilting Bed Mark 2" Egerton Hospital Equip. (undate.

Brochure "The Rotorest", Kinetic Concepts, Inc. (undated).

Brochure "The LIC Turnover Bed", LICCARE (undated).

Defendant's Motion for Summary Judgment of Invalidity Under 35 U.S.C. 102(b), from "Related Litigation," Civil Action No. SA–91–CA–0927, U.S. Dist. Ct., W.D. Texas, San Antonio Division.

(List continued on next page.)

*Primary Examiner*—Michael F. Trettel

[57] ABSTRACT

An air sac for use on a low air loss bed. The air sac is provided with a releasable connector for retaining the air sac to the low air loss bed and with a nipple for receiving air from a gas supply source to inflate the air sac. The air sac is also provided with a cutout which allows the patient to be rolled toward one end of the air sac when the air sac is inflated. A pillar is provided on the end of the air sac toward which the patient is rolled when the air sac is inflated to retain the patient on the air sac. The air sacs are arranged in sets with every other sac mounted to the frame of the low air loss bed in alternating arrangement whereby the patient is rolled first in one direction when the air sacs of one set are inflated and then back in the other direction when the air sacs in the first set are deflated and the air sacs in the second set are inflated.

3 Claims, 3 Drawing Sheets

U.S. PATENT DOCUMENTS

| | | | |
|---|---|---|---|
| 3,467,081 | 9/1969 | Glass . | |
| 3,477,071 | 11/1969 | Emerson | 5/61 |
| 3,485,240 | 12/1969 | Fountain | 5/61 X |
| 3,492,988 | 2/1970 | De Mare | 5/61 X |
| 3,587,568 | 6/1971 | Thomas . | |
| 3,653,083 | 4/1972 | Lapidus . | |
| 3,678,520 | 7/1972 | Evans | 5/456 X |
| 3,775,781 | 12/1973 | Bruno et al. . | |
| 3,909,858 | 10/1975 | Ducker . | |
| 4,193,149 | 3/1980 | Welch . | |
| 4,525,885 | 7/1985 | Hunt et al. | 5/469 X |
| 4,542,547 | 9/1985 | Sato . | |
| 4,638,519 | 1/1987 | Hess | 5/455 |
| 4,686,722 | 8/1987 | Swart . | |
| 4,694,520 | 9/1987 | Paul et al. . | |
| 4,745,647 | 5/1988 | Goodwin . | |
| 4,797,962 | 1/1989 | Goode . | |
| 5,152,021 | 10/1992 | Vrzalik | 5/455 |
| 5,181,288 | 1/1993 | Heaton et al. | 5/453 X |

FOREIGN PATENT DOCUMENTS

| | | |
|---|---|---|
| 1442994 | 7/1972 | United Kingdom . |
| 1499938 | 2/1978 | United Kingdom . |
| 2026315 | 2/1980 | United Kingdom . |
| 1576641 | 10/1980 | United Kingdom . |
| 2108837 | 5/1983 | United Kingdom . |
| 8404884 | 12/1984 | WIPO . |

OTHER PUBLICATIONS

Defendant's Motion for Summary Judgment of Invalidity Under 35 U.S.C. 112, from "Related Litigation," Civil Action No. SA–91–CA–0927, U.S. Dist. Ct., W.D. Texas, San Antonio Division.

LOW AIR LOSS BAG FOR PATIENT SUPPORT

This application is a continuation of application Ser. No. 08/822,366 filed Mar. 20, 1997, which is a continuation of application Ser. No. 08/618,337 filed Mar. 19, 1996now abandoned, which is a continuation of application Ser. No. 08/299,326 filed Aug. 31, 1994, now abandoned, which is a continuation of application Ser. No. 07/948,460 filed Sep. 21, 1992, now abandoned, which is a continuation of application Ser. No. 07/494,787 filed Mar. 12, 1990, now abandoned, which is a continuation of application Ser. No. 07/273,759 filed Nov. 17, 1988, now abandoned, which is a continuation of application Ser. No. 07/057,516 filed Jun. 1, 1987, now abandoned, which is a continuation-in-part of application Ser. No. 06/905,553 filed Sep. 9, 1986, now abandoned, which is a continuation-in-part of application Ser. No. 06/784,875 filed Oct. 4, 1985, now abandoned, which is a continuation-in-part of application Ser. No. 06/683,153 filed Dec. 17, 1984, now abandoned.

BACKGROUND OF THE INVENTION

The present invention relates to an air sac for use on a low air loss patient support system. More particularly, it relates to an air sac for use on a low air loss bed such as the bed disclosed in my co-pending application Ser. No. 905,553, now abandoned, having integral means for retaining a patient on the air sac when the patient is moved toward the ends thereof. Such a bed can be used to advantage for the prevention of bed sores and the collection of fluid in the lungs of bedridden patients.

A number of patents, both U.S. and foreign, disclose air mattresses or cushions comprised of sets of cells which are alternately inflated and deflated to support a patient first on one group of air cells and then the other group. Those patents include the following U.S. Pat. Nos. 1,772,310, 2,245,909, 2,998,817, 3,390,674, 3,467,081, 3,587,568, 3,653,083, 4,068,334, 4,175,297, 4,193,149, 4,197,837, 4,225,989, 4,347,633, 4,391,009, and 4,472,847, and the following foreign patents: G.B. 959,103, Australia 401,767, and German 24 46 935, 29 19 438 and 28 07 038. None of the devices disclosed in those patents rolls or alternately moves the patient supported thereon to further distribute the patient's body weight over additional air cushions or cells or to alternately relieve the pressure under portions of the patient's body.

There are also a number of patents which disclose an inflatable device other than an air mattress or cushion but which involve alternately supplying air to a set of cells and then to another set of cells. Those patents include U.S. Pat. Nos. 1,147,560, 3,595,223, and 3,867,732, and G.B. Patent No. 1,405,333. Of those patents, only the British patent discloses the movement of the body with changes in air pressure in the cells of the device. None of those references disclose an apparatus which is adaptable for use in a low air loss patient support system.

British Patent No. 946,831 discloses an air mattress having inflatable elongated sacs which are placed side-by-side and which are in fluid communication with each other. A valve is provided in the conduit connecting the insides of the two sacs. Air is supplied to both sacs in an amount sufficient to support the patient, thereby raising the patient off the bed or other surface on which the air mattress rests. Any imbalance of the weight distribution of the patient causes the air to be driven from one sac to the other, allowing the patient to turn toward the direction of the now deflated sac. An automatic changeover valve, the details of which are not shown, is said to then inflate the deflated sac while deflating the sac which was originally inflated, thereby rocking the patient in the other direction.

The device disclosed in that patent is limited in its ability to prevent bed sores because when the patient rocks onto the deflated sac, there may be insufficient air to support the patient up off the bed or other surface on which the air mattress rests, resulting in pressure being exerted against the patient's skin which is essentially the same as the pressure that would have been exerted by the board or other surface without the air mattress. Even if there were enough air left in the deflated sac to support the patient, if the air mattress were constructed in a low air loss configuration, the air remaining in the sac would be slowly lost from the sac until the patient rested directly on the bed or other surface with the same result. Finally, that device is not adaptable for use on a bed having hinged sections corresponding to the parts of the patient's body lying on the bed so that the angle of inclination of the various sections of the bed can be adjusted for the patient's comfort or for therapeutic reasons.

The present invention is characterized by a number of advantages over the prior art devices, including the ability to maintain air pressure, the ability to quickly and easily replace one or more of the air sacs while the low air loss bed is in operation, and the ease of adjustment of the air pressure in the air sacs.

It is, therefore, an object of the present invention to provide a low air loss, water vapor permeable air sac which is comprised of a substantially rectangular enclosure constructed of a water vapor permeable material, means for connecting the inside of the enclosure with a source of gas for inflating the enclosure, means for releasably securing the enclosure to a low air loss bed, integral means for moving a patient resting on the top surface of the rectangular enclosure towards the end thereof when the enclosure is inflated, and integral means at the end of the rectangular enclosure toward which the patient is moved for retaining the patient on the top surface of the enclosure.

Another object of the present invention is to provide an air sac with a single opening which can be quickly and easily detached from an air bed to allow the easy replacement of the air sac, even while the bed is in operation.

Another object of the present invention is to provide an air sac for use on a low air loss bed capable of rolling a patient back and forth on the bed while safely retaining the patient thereon.

Other objects and advantages will be apparent to those of skill in the art from the following disclosure.

SUMMARY OF THE INVENTION

These objects and advantages are accomplished in the present invention by providing an air sac for use on a low air loss bed having a plurality of transversely mounted air sacs mounted thereon comprising an enclosure for supporting a patient and distributing pressure over the body of the patient to prevent pressure points and means for connecting the inside of the enclosure with a source of gas for inflating the enclosure with gas. The enclosure is provided with means for securing the enclosure to a low air loss bed and means for moving a patient supported thereon toward one end of the enclosure when the air sac is inflated. The air sac is also provided with integral means for retaining the patient supported on the top surface of the enclosure when the patient is moved toward the end of the enclosure.

DETAILED DESCRIPTION OF THE PREFERRED EMBODIMENTS

Figure 1:
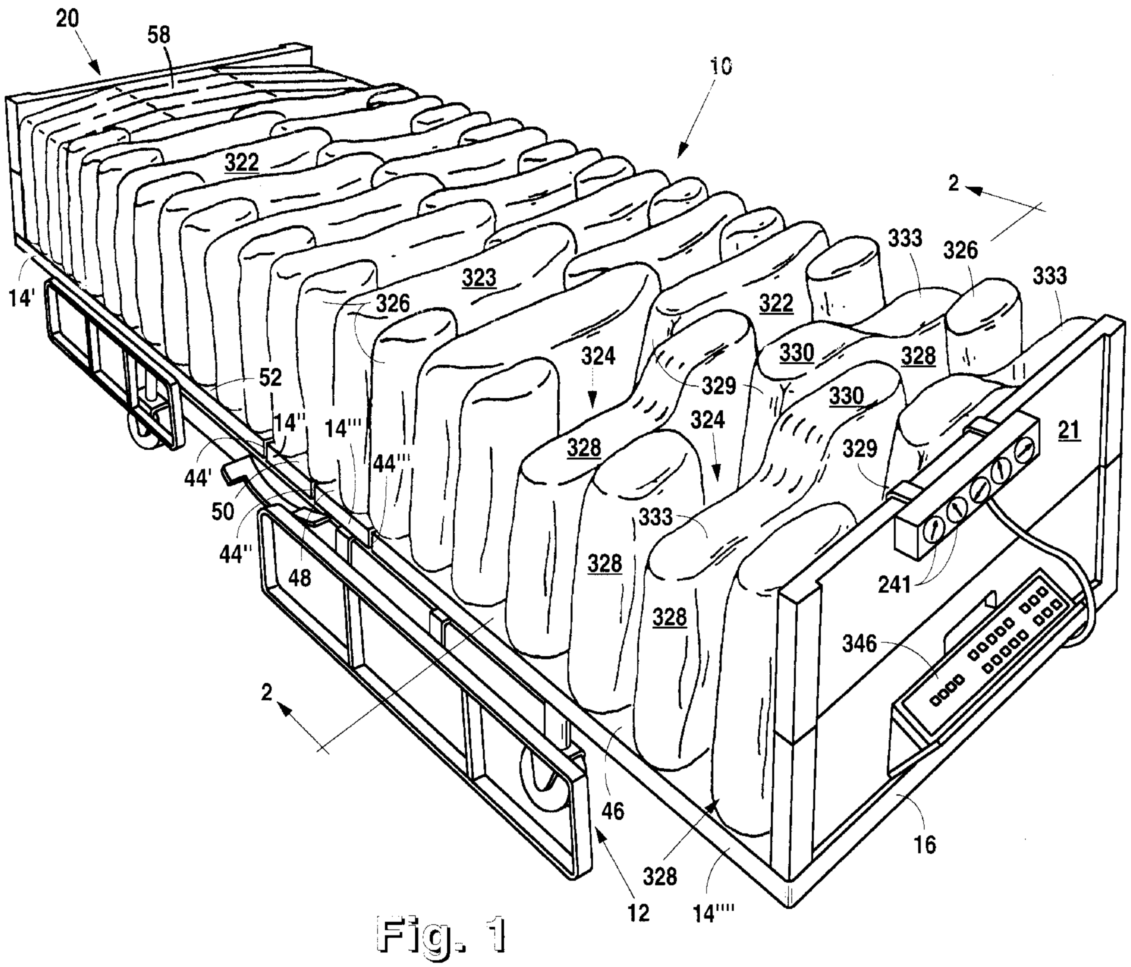
FIG. 1 is a perspective view of a low air loss bed having the presently preferred embodiments of the air sac of the present invention mounted thereto.

Referring to FIG. 1, there is shown a bed 10 including a frame 12. The frame 12 is comprised of a plurality of sections 14', 14", 14'" and 14"", hinged at the points 44', 44" and 44'", and end members 16. The frame 12 is provided with headboard 20 at one end and a foot board 21 at the other end.

The air sacs 58 are substantially rectangular in shape, and are constructed of a coated fabric or similar material through which water vapor can move, but which water and other liquids will not penetrate. The fabric sold under the trademark "GORE-TEX" is one such suitable material.

Referring to FIGS. 1–6, air sacs of different configuration are shown for use according to the location at which they are mounted on the frame 12 of bed 10. For instance, some of the air sacs mounted to the feet baseboard 46 are of the configuration designated at reference numeral 328. Likewise, some of the air sacs mounted to the feet baseboard 46 are of the configuration designated at reference numeral 322, and all the air sacs mounted to leg baseboard 48 and seat baseboard 50 are of the configuration designated at reference numeral 322. Alternatively, some or all of the air sacs designated at reference numeral 322 can be replaced with air sacs of the configuration shown at reference numeral 325 (see FIG. 4) or 337 (see FIG. 6). Some of the air sacs shown at reference numeral 322 are also mounted to head baseboard 52, as are air sacs of the configuration shown at reference numeral 58.

Figure 2:
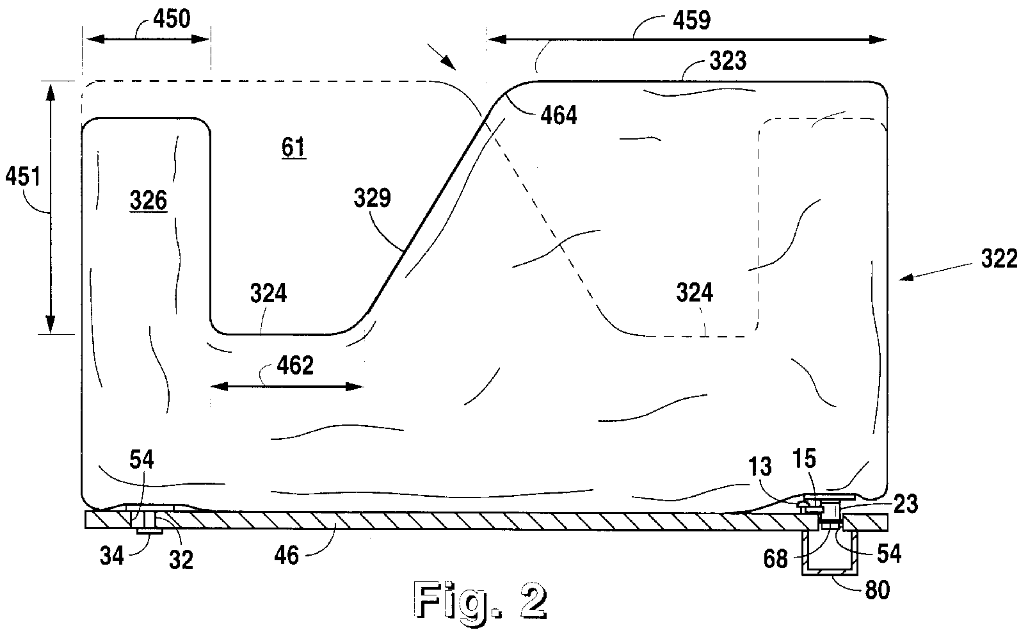
FIG. 2 is a cross-sectional view of the bed of FIG. 1, showing an air sac with a second air sac therebehind taken along the lines 2—2 in FIG. 1, the second air sac being shown in shadow lines r purposes of clarity.

Air sacs 58, 322, 325, 328, and 337 are constructed in the form of a substantially rectangular enclosure, at least the top surface 323 of which is constructed of water vapor permeable material as described above. Air sacs 58, 322, 325, 328 and 337 are provided with means for connecting the inside of the air sac enclosure to a source of gas (not shown) to inflate the enclosure with gas in the form of the nipple 23 (see FIGS. 2–6) which extends through the hole 54 in baseboard 50 into a gas manifold 80 mounted to baseboard 50 as shown in FIG. 2. An O-ring 68 is provided to seal nipple 23 in hole 54, and extension tab 15 fits under screw 13 to hold air sac 322 in place. Air sac 58, 322, 325, 328, or 337 is also provided with means for releasably securing the air sac enclosure to the low air loss bed 10 in the form of a post 32, having retainer 34 on the end thereof, which extends through hole 54 to engage the underside of baseboard 50.

Means is provided for moving a patient 348 (see FIGS. 7A–7D) supported on air sacs 322, 325, 328, or 337 toward one side of frame 12 when air sacs 322, 325, 328, or 337 are inflated and for retaining the patient 348 on the top surface 323 of air sacs 322, 325, 328, or 337 when patient 348 is rolled or rocked towards one side of frame 12 or the other. The means for moving patient 348 supported on air sacs 322, 325, 328, or 337 toward one side of frame 12 when the air sacs 322, 325, 328, or 337 are inflated comprises a cutout 324 in the top 323 of the substantially rectangular shape of each of the air sacs 322, 325, 328 or 337.

Each air sac 322, 325, 328, or 337 is also provided with means for retaining a patient 348 on the top surface 323 of the air sac 322, 325, 328, or 337 when patient 348 is rolled toward the side of frame 12 by the inflation of air sacs 322, 325, 328, or 337 in the form of a pillar 326 which is integral with each air sac 322, 325, 328, or 337 and which, when inflated, projects upwardly to form the end and corner of the substantially rectangular enclosure of air sac 322, 325, 328, or 337.

As shown in FIG. 1, a plurality of air sacs 58, 322, 325, 328 and/or 337 is mounted transversely on the frame 12 of bed 10. The air sacs 322, 325, 328, or 337 are divided into a first set in which the pillar 326 and cutout 324 are closer to one side of bed frame 12 than the other and a second set of air sacs 322, 325, 328, or 337 in which the pillar 326 and cutout 324 are closer to the second side of the bed frame 12. The air sacs 322, 325, 328, or 337 of the first set and the air sacs 322, 325, 328, or 337 of the second set alternate with each other along the length of baseboards 46, 48, 50, and 52. As will be explained, the first set of air sacs 322, 325, 328, or 337 is inflated with air from a gas source (not shown), thereby causing the patient 348 supported thereon to be rolled toward the first side of bed frame 12 and then deflated while the second set of air sacs 322, 325, 328, or 337 is inflated, thereby moving the patient 348 supported thereon toward the other side of bed frame 12 (see FIG. 7A–7D). The air pressure in the sets of air sacs is monitored by gauges 241.

Figure 3:
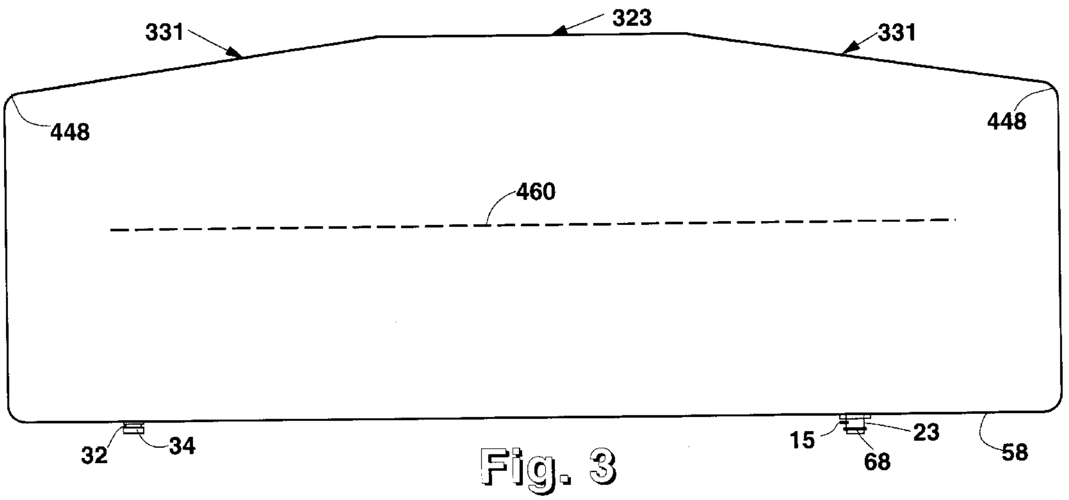
FIG. 3 is an end view of a presently preferred embodiment of an air sac for use on the low air loss bed of FIG. 1.
Figure 7A:
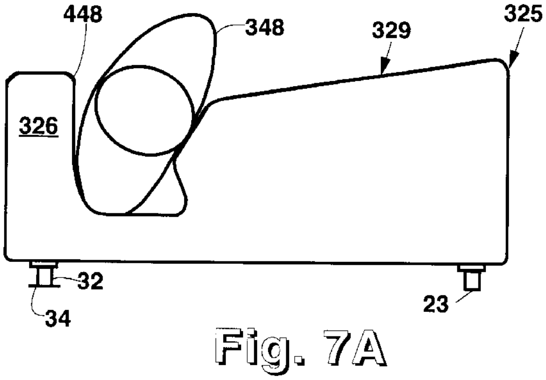
FIGS. 7A–7D are an end view of a patient supported upon the top surface of the air sacs of the low air loss bed of the present invention (7D), as that patient is rocked toward one side of the frame of the low air loss bed (7A), then toward the other side (7C) or supported on the air sacs when all air sacs are fully inflated (FIG. 7B).
Figure 7B:
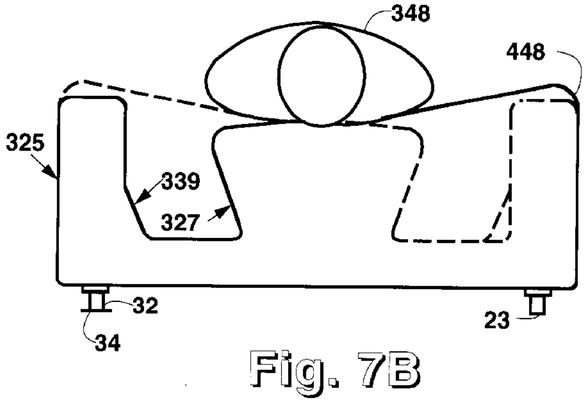
Figure 7C:
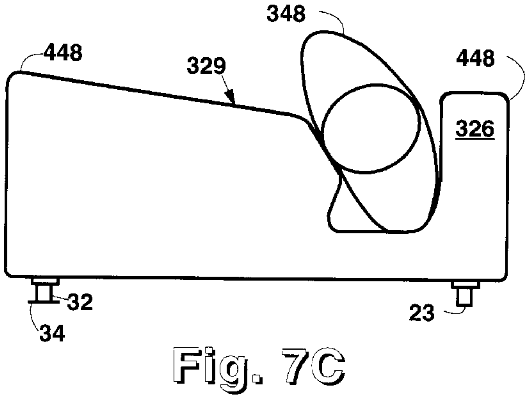
Figure 7D:
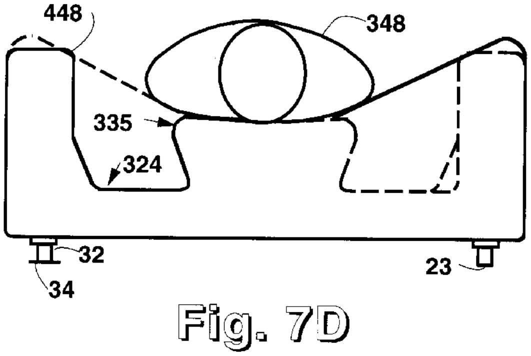
Figure 6:
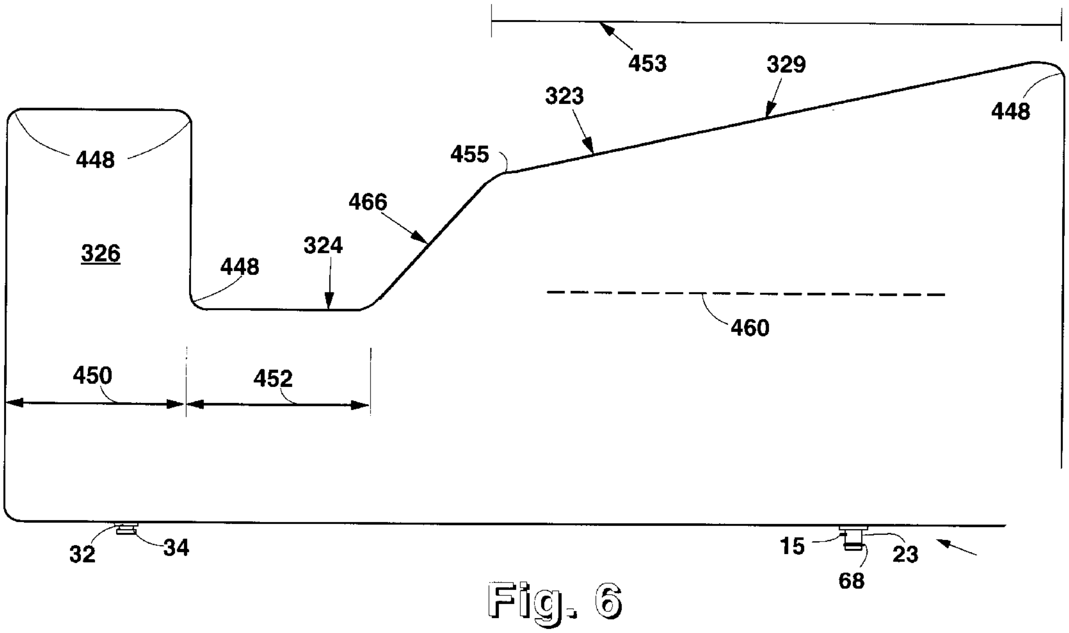
FIG. 6 is an end view of another presently preferred embodiment of an air sac for use on the low air loss bed of FIG. 1.

The air sacs 58 which are mounted on head baseboard 52 are provided with a flat top surface 323 so that the head of patient 348 is retained in a relatively constant position while the body of patient 348 is alternately rolled first toward one side of the bed frame 12 and then back toward the other side of bed frame 12. Referring to FIG. 3, an air sac 58 is shown for use under the head of patient 348. Air sac 58 is substantially rectangular in shape, but is provided with a slanted top surface 323 in the area 331 adjacent to corners 448. The total height of air sac 58 is less than the height of air sacs 322, 325, 328, and 337 because when patient 348 lies upon air sacs 322, 325, 328, and/or 337, the heavier portions, i.e., the portions of the body other than the head, sink into those air sacs 322, 325, 328, and/or 337 as shown in FIG. 7D. When the patient 348 sinks into air sacs 322, 325, 328, and/or 337, the head rests evenly on air sacs 58 because the head does not sink into air sacs 58 as far as the other portions of the patient's body sinks into the air sacs 322, 325, 328, or 337 on which the rest of the body is supported.

Figure 5:
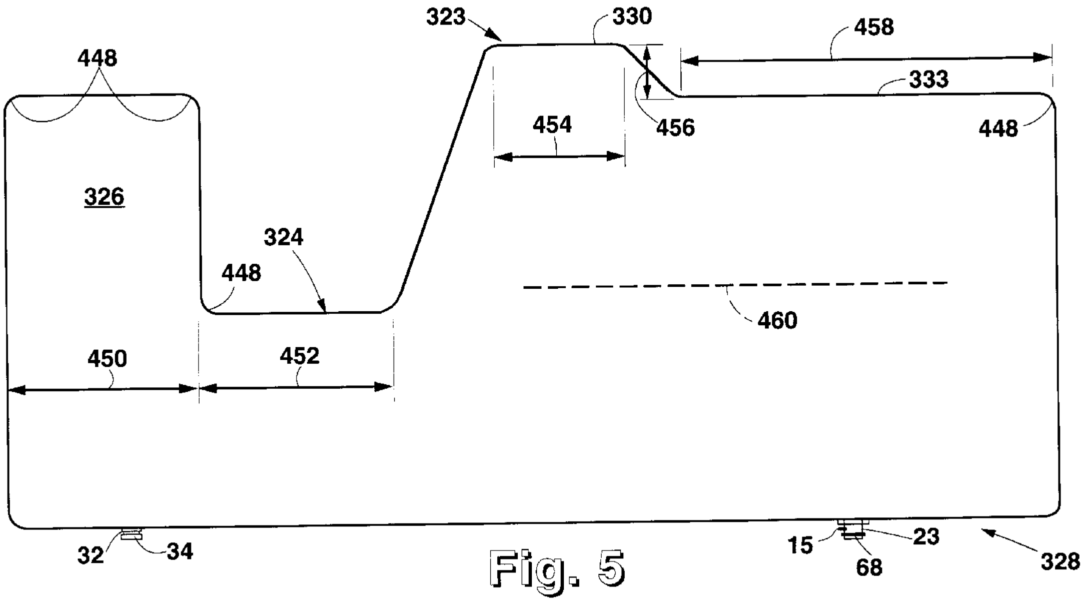
FIG. 5 is an end view of another presently preferred embodiment of an air sac for use on the low air loss bed of FIG. 1.

The air sacs 328 mounted on the foot baseboard 46 are also provided with a cutout 324 and pillar 326 as described for the air sacs 322. Additionally, air sacs 328 are provided with a hump 330 so that the legs of patient 348 are relatively restrained from movement during the alternate back and forth movement of patient 348, thereby helping to retain the patient 348 on the top surface 323 of air sacs 58, 322, 325, 328, and 337 as well as helping to distribute the pressure exerted against the skin of patient 348 over an increased area. Referring to FIG. 5, there is shown an end view of an air sac 328 having hump 330 formed in the top surface 323 thereof. As can be seen, when air sac 328 is inflated, hump 330 and pillar 326 project upwardly to help prevent the rolling of patient 348 too far to one side of air sac 328 or the other.

As noted above, some of the air sacs mounted to foot baseboard 46, and preferably all the air sacs mounted to legs baseboard 48 and seat baseboard 50, are of the configuration shown in FIG. 2 at reference numeral 322. Alternatively, air sac 322 is constructed in the configuration shown at reference numeral 325 of FIG. 4 or reference numeral 337 of FIG. 6. Air sac 325 is provided with cutout 324 of approximately the same depth as the cutout 324 of air sacs 322, 328 and 337, but the slope of the top surface 323 of air sac 325 in the area 329 is less than the slope of the top surface 323 in the area 329 of air sacs 322, 328, and 337. Air sac 325 is also provided with an area, indicated by reference numeral 327, in which the slope of the wall of cutout 324 is reversed. The corner 335 of air sac 325 acts as a balance point as shown in FIGS. 7A and 7C as the patient 348 is alternately rolled from one end of the air sac 325 to the other such that the body weight of patient 348 is used to assist in the rolling of patient 348 towards each end of air sac 325. To further distribute the pressure exerted by air sac 325 against the shoulder and hip of patient 348 when the patient is rolled to the position shown in FIGS. 7A and 7C, the cutout 324 is provided with a sloped portion, indicated at reference numeral 339, of the wall of pillar 326. Air sac 325, in conjunction with the adjustment of the air pressure in the air sacs 58, 322, 328, and/or 337, is used under different portions of the body of patient 348 to increase or decrease the extent and speed with which patient 348 is rolled from one side of bed frame 12 to the other. For instance, air sac 325 is particularly well-suited for use under the shoulders of a patient 348.

It will be understood by those skilled in the art who have the benefit of this disclosure that, although patient 348 is shown supported on air sacs having the configuration shown at reference numeral 325 in FIGS. 7A–7D, the patient 348 can also be alternately rolled back and forth when supported on any of the air sacs 322, 328, or 337. Regardless of the configuration utilized, when one set of air sacs 322, 325, 328 or 337 is inflated, one side of patient 348 drops into cutout 324, causing the patient 348 to roll toward one end of the air sac 322, 328, 328, or 337. As that set of air sacs 322, 325, 328, and/or 337 is deflated and the second set of air sacs 322, 325, 328, and/or 337 is inflated, patient 328 is first returned to the horizontal position shown in FIG. 7D and then rolled toward the other end of air sacs 322, 325, 328, and/or 337.

As noted above, each of the air sacs 58, 322, 325, 328, and 337 forms a substantially rectangular enclosure, the dimensions of the rectangle being approximately 18×39 inches when uninflated. When inflated, the enclosure measures approximately 16×36 inches. Each is provided with a baffle 460 attached to the inside of side walls 61 (see FIGS. 1 and 2) which holds the side walls 61 against bowing when the air sac 58, 322, 325, 328, or 337 is inflated. Each of the corners 448 has a radius of curvature of approximately three inches, and the depth of cutout 324 in the direction shown by line 451 ranges from approximately eight to approximately thirteen inches, the presently preferred dimension being about ten inches. The dimension of pillar 326 of air sacs 325, 328, and 337 in the direction shown by line 450 ranges from approximately five to approximately twelve inches, the presently preferred dimensions being from about seven to about twelve inches. That range of dimensions along line 450 gives pillar 325 sufficient bulk, and therefore sufficient rigidity when inflated, to prevent, in conjunction with baffle 460, the forcing of the pillars 326 outwardly from the sides of the bed frame 12 when both sets of the air sacs 58, 322, 325, 328, and 337 are inflated either partially, i.e., when patient 348 is in the position shown in FIG. 7D, or fully inflated, as when patient 328 is in the position shown in FIG. 7B. The configuration of air sac 325 (see FIG. 4) is even more effective at preventing that outward movement of pillar 326 because of the sloped portion 339 of the wall of pillar 326 toward the bottom of cutout 324, and it will be understood by those skilled in the art who have the benefit of this disclosure that any or all of the pillars 326 of air sacs 322, 328 or 337 can be provided with a similarly sloped portion 339.

Referring to FIG. 2, the dimension of the top surface 323 of air sac 322 along line 459 is approximately nineteen inches. Top surface 323 then drops off into cutout 324 in a curve 464 of approximately a three inch radius along surface 329. The dimension of cutout 324 in the direction shown by line 462 ranges from about five to about ten inches, depending upon the dimension of pillar 326 in the direction of line 450, the presently preferred dimension being approximately seven inches.

Figure 4:
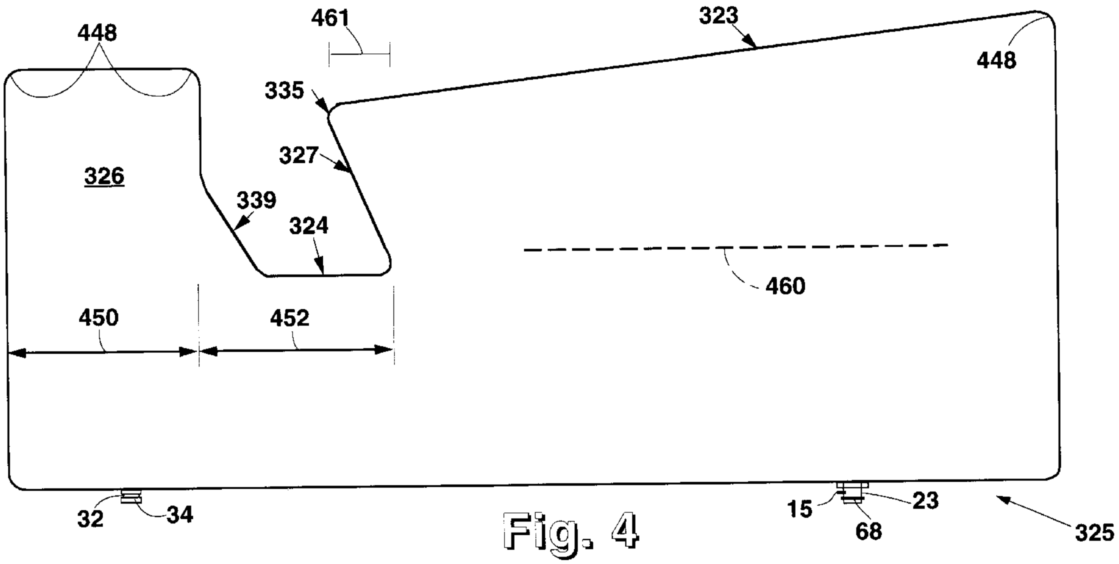
FIG. 4 is an end view of another presently preferred embodiment of an air sac for use on the low air loss bed of FIG. 1.

Referring to FIG. 4, the dimension of cutout 324 in the direction shown by line 452 is approximately five to ten inches. The slope of the reversed portion 327 of the top surface 323 of air sac 325 is determined by the dimension of line 461, which in a presently preferred embodiment is between two and five inches, depending upon the dimension of lines 450 and 452, all of which can be varied depending upon the particular operating mode desired and the weight and size of patient 348.

The dimensions of air sac 328 (FIG. 5) are as follows. As noted above, the dimension of pillar 326 in the direction of line 450 can be varied from about five to about twelve inches, as can the dimension of cutout 324 in the direction of line 452, depending upon the dimension of line 450. The dimension of hump 330 on air sac 328 in the direction shown by line 454 is approximately five inches, and in the direction shown by line 456, the dimension is approximately two inches. The dimension of surface 333, as shown by line 458 is approximately fourteen inches.

Referring now to air sac 337 (FIG. 6), the dimension of the surface 329 in the direction shown by line 453 is approximately twenty inches, and that surface 329 drops off into cutout 324 in a curve 455 of approximately a three inch radius along a surface 466 having a steeper slope than the surface 329. The dimension of pillar 326 and cutout 324 can be varied as described above with reference to air sacs 322, 325 and 328.

The use of individual air sacs 58, 322, 325, 328, or 337 rather than a single air cushion which runs the length of bed frame 12 allows the replacement of individual sacs should one develop a leak, need cleaning or otherwise need attention. When it is desired to remove an individual air sac 58, 322, 325, 328, or 337 from its respective baseboard 46, 48, 50, or 52, post 32 and retainer 34 are removed from hole 54 (see FIG. 2). Nipple 23 is then rotated until extension tab 15 rotates out of engagement with screw 13 and nipple 23 is then pulled firmly to remove it from hole 54.

The hump 330 in air sacs 328 provides a longitudinal barrier along the top surface of the air sacs 328 such that one of the legs of patient 348 is retained on either side of that longitudinal barrier even during the alternating inflation and deflation of the air sacs 328. In this manner, the hump 330 prevents patient 348 from rolling too far to one end of air sac 328 or the other. Further, the legs of patent 348 do not slide and/or rub together while patient 348 is being alternately rolled from one side of the bed frame 12 to the other. It will be understood by those skilled in the art that the air sacs 328 having the humps 330 therein can be replaced by air sacs 322, 325, or 337 depending upon the type of therapy and the extent of motion desired for a particular patient.

Although the present invention has been described in terms of the foregoing preferred embodiments, this description has been provided by way of explanation only and is not to be construed as a limitation of the invention, the scope of which is limited only by the following claims.

What is claimed is:

1. An improved air sac for use in a patient support system comprising a plurality of air sacs transversely mounted thereto for supporting a patient, comprising:

an inflatable enclosure provided with portions defining first and second ends, an interior, a substantially rectangular vertical cross-section, and a top surface for distributing any pressure exerted against a patient supported thereon to prevent pressure points, the top surface having at least first and second sloped portions;

means for connecting the interior of the enclosure with a source of gas for inflating and deflating the enclosure with the gas;

at least one means formed in the top surface of the enclosure for rolling the patient toward the first end of the enclosure; and at least one means formed in the top surface of the enclosure for retaining the patient supported thereon when the patient is rolled toward the first end of the enclosure by the rolling means.

2. An improved air sac for an oscillating air bed, comprising:

an inflatable enclosure, provided with a wall portions defining sides, having opposed first and second ends, a top a bottom, an interior, and a top surface having at two edges and at least first and second sloped portions intermediate said edges, for supporting a patient on the top surface thereof when mounted transversely to an air bed;

means for connecting the interior of the inflatable enclosure to a source of gas for inflating the enclosure;

the inflatable enclosure having at least one means for rolling the patient toward one side of the surface; and the inflatable enclosure having at least one means for retaining the patient on the sac when the patient is rolled.

3. A composite air sac for an oscillating air bed, comprising:

an air sac for supporting a patient, the sac having opposite end walls and opposite upper and lower air surfaces, the upper surface having a hump form between the end walls, the hump having a length less than one-third of the distance between the opposite end walls and a height sufficient to form a barrier and maintain a separation between the legs of a patient while retaining the patient on the sac during oscillation; and means for connecting the sac to an oscillating bed.

* * * * *